(12) United States Patent
Khomo

(10) Patent No.: US 7,317,450 B2
(45) Date of Patent: Jan. 8, 2008

(54) SPATIAL CHIROGRAPHIC SIGN READER

(76) Inventor: Malome T. Khomo, 320 Bell Ave., La Grange, IL (US) 60525

( * ) Notice: Subject to any disclaimer, the term of this patent is extended or adjusted under 35 U.S.C. 154(b) by 699 days.

(21) Appl. No.: 10/672,647

(22) Filed: Sep. 26, 2003

(65) Prior Publication Data
US 2005/0069202 A1 Mar. 31, 2005

(51) Int. Cl.
G09G 5/00 (2006.01)

(52) U.S. Cl. .................. 345/179; 345/156; 345/157; 345/161

(58) Field of Classification Search ............... 345/179, 345/156, 157, 161
See application file for complete search history.

(56) References Cited

U.S. PATENT DOCUMENTS

| | | | |
|---|---|---|---|
| 4,613,866 A | | 9/1986 | Blood |
| 5,576,727 A | * | 11/1996 | Rosenberg et al. ......... 345/179 |
| 6,081,261 A | | 6/2000 | Stork et al. |
| 6,160,924 A | | 12/2000 | Lazar |
| 6,229,102 B1 | | 5/2001 | Kitaguchi et al. |
| 2002/0145596 A1 | | 10/2002 | Vardi |
| 2003/0179201 A1 | | 9/2003 | Thacker |

FOREIGN PATENT DOCUMENTS

| WO | WO 95/21436 | * | 8/1995 |
|---|---|---|---|
| WO | WO-95/21436 A | | 8/1995 |
| WO | WO 99/26191 | * | 5/1999 |
| WO | WO-99/26191 A | | 5/1999 |
| WO | WO-2004/029866 A | | 4/2004 |

* cited by examiner

*Primary Examiner*—Richard Hjerpe
*Assistant Examiner*—Leonid Shapiro
(74) *Attorney, Agent, or Firm*—McAndrews, Held & Malloy, Ltd.

(57) ABSTRACT

The present invention discloses spatial tracking of writing for interpretation of writing motion using three-dimensional position sensors to identify signs, symbols, or glyphs made by a writing stylus in real time. The present invention discloses an elongated pointing device capable of measuring angular directions in a plane and true geometrical distance measurement by tracking radial distance along a ray such that true Cartesian positions in the plane are capable of being tracked. A two-dimensional true geometry tracker may be applied twice. A first time to span the X-Y plane and then again on an orthogonal axis ensuring span in a three-dimensional volume. The tracker may form spherical or cylindrical spatial coordinates and may transform coordinates to Cartesian font coordinates. The present invention also discloses a platform capable of mounting the device for spatial tracking of a stylus. A flat face of the platform may define a surface and volume where a receptacle may engage the stylus and may be actuated by a writer. Sensors on a boom permit two rotation axes to track the radial, polar, and altitude coordinates into three-dimensional (3-D) points and determine dynamic state variables associated with the stylus.

20 Claims, 4 Drawing Sheets

SPATIAL CHIROGRAPHIC SIGN READER

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

BACKGROUND OF THE INVENTION

Handwriting is traditionally performed on a writing surface, such as paper, with an ink-dispensing pen or other writing instrument, such as a pencil, or paint brush. The result is expected to be understandable by human readers.

Recently, electronic handwriting has been done on planar X-Y digitizing pads using a stylus employed to simulate handwriting upon the pad to create an electronic facsimile of handwriting. The digitizing system collects an array of X-Y coordinates of pixels corresponding to the curve tracing positional points of the stylus tip. Usually the X-Y arrays are gathered and stored as positional arrays, and are made discernible to a human reader when rendered on an X-Y display, but are rarely discernible as text by a device.

Attempts to make handwriting discernible as machine-readable text have concentrated on handwriting recognition of the X-Y traces by translation into binary coded text after affine transformation of the X-Y trace. Other techniques of recognition of the X-Y traces employ stochastic recognition based on various randomness assumptions using a statistical model. Other attempts with more deterministic techniques of recognition of the X-Y traces use velocity profiling in on-line recognition and forward search in batch recognition. Many similar X-Y trace recognition efforts have resulted in numerically intense algorithms which tend to restrict the recognition process to off-line batch processing, conducted as a separate procedure long after the writing has been done.

More recently, on-line recognition systems have dispensed with natural hand-writing and created specialized pen-stroke shorthand for letters of the Latin alphabet and Arabic numerals and punctuation marks, such as an electronic stylus recognition system. Field experience has shown that recognition error rates are high enough to cause manufacturers to begin supplanting the system with keypads and software keyboards. Miniaturized keypads are slow when compared to normal handwriting speed. Full-sized keyboards, although faster in use than miniature keyboards, are too cumbersome for optimum purposes.

Devices that track X-Y motion in true geometry exist in the form of analog joysticks. These are used as actuators for simulation and as gaming input devices, where a hand-held game controller may incorporate an analog joystick that permits tracking of directional inputs over 360 degrees around an action reference point, and is small enough to be manipulated by a finger tip. The cited range of 360 degrees signifies that the joystick spans a projection of the X-Y plane, but does not span a radial distance, i.e., the joystick is not operable to span a projection along the Z-axis. This is because the range of each joystick sensor is less than the radial range needed to be spanned.

The cited joystick may utilize optical quadrature sensor wheels over two orthogonal axes of rotation. Such a configuration may suffice for directional control over a planar range, but is inadequate for the capture of natural handwriting strokes because the latter requires a depth sensor.

Further limitations and disadvantages of conventional and traditional approaches will become apparent to one of skill in the art through comparison of such systems with embodiments presented in the remainder of the present application with reference to the drawings.

SUMMARY OF THE INVENTION

Aspects of the present invention may be found in a method for spatially reading handwritten symbols. The method may comprise defining a spatial three dimensional volume, deploying a writing tip within the spatial three dimensional volume, writing a handwritten symbol with the writing tip, measuring positions of the writing tip within the volume as the handwritten symbols are being executed, measuring motions of the writing tip within the volume as the handwritten symbols are executed, and identifying two dimensional handwritten symbols from the measured three dimensional positions and motions of the writing tip.

In another embodiment of the present invention, the method comprises defining a plane corresponding to an X-Y plane, locating an origin in space proximate the plane, defining a Z-axis orthogonal to the X-Y plane, and applying a coordinate system to define all points relative to one of the origin, the X-Y plane, the Z-axis, and angular relations corresponding to a position of the writing tip.

In another embodiment of the present invention, the method comprises applying one of Cartesian coordinates, spherical coordinates, and cylindrical coordinates to the spatial three dimensional volume.

In another embodiment of the present invention, the method comprises inserting a writing stylus into a receptacle in a bracket mounted on a boom in a handwritten symbol reader.

In another embodiment of the present invention, the method comprises a user grasping a writing stylus and performing a writing upon a writing area within a handwritten symbol reader.

In another embodiment of the present invention, the method comprises measuring changes in an electrical component over time as the writing tip is moved from position to position during a writing.

In another embodiment of the present invention, the method comprises measuring changes in an electrical component over time as the writing tip moves about with respect to a fixed position in space.

In another embodiment of the present invention, the method comprises measuring one of voltage, current, resistance, inductance, and impedance in real time.

In another embodiment of the present invention, the method comprises measuring changes in an electrical component over time as the writing tip translates from position to position three-dimensionally during a handwriting.

In another embodiment of the present invention, the method comprises measuring changes in an electrical component over time as the writing tip traverses a three-dimensional path of motion with respect to a fixed position in space.

In another embodiment of the present invention, the method comprises measuring electronically one of voltage, current, resistance, inductance, and impedance in real time.

In another embodiment of the present invention, the method comprises determining measurement coordinates relative to a reader fulcrum pivot in position and an associated time coordinates.

In another embodiment of the present invention, the method comprises identifying two dimensional handwritten symbols from the measured three dimensional positions and motions of the writing tip. Identifying further comprises aligning an X-Y plane adjacent a writing portion of a writing platform, aligning a Z-axis with a ray pointing outward perpendicularly from the writing platform, defining the origin to be away from the writing platform, and projecting the three dimensional position and motions onto a two dimensional plane.

In another embodiment of the present invention, the method comprises identifying two dimensional handwritten symbols from the measured three dimensional positions and motions of the writing tip. Identifying further comprising measuring motion over time along at least two orthogonal axes of rotation and along a radial distance, applying a first rotary measurement to span rotation in a projection plane over the flat surface of the platform, applying a second rotary measurement to span an angular elevation from the projection plane, and applying a third radial measurement of linear distance from a reader fulcrum pivot along the elevation.

A device according to an embodiment of the present invention comprises a device for spatially reading handwritten symbols. The device comprising a platform having a flat surface, a spatial tracking assembly may be positioned adjacent to and may be rotatably engaging a planar writing area selected from the flat surface of the platform. The spatial tracking assembly may be configured to slidably accept a writing stylus and to rotate with the stylus about an axis parallel to the flat surface. A stylus tip of the writing stylus may be adapted to trace a three dimensional path in a volume above the flat surface of the platform.

In another embodiment of the present invention, the spatial tracking assembly may comprise a boom, an assembly support pinion providing rotatably engagement with the flat surface of the platform, a fulcrum housing having a fulcrum bracket connected to the assembly support pinion, a fulcrum pinion rotatably engaging the fulcrum housing orthogonally to the assembly support pinion, and a securing means for rotatably securing the spatial tracking assembly to the flat surface of the platform. The securing means may comprise a restricting flange on one end of the assembly support pinion, a locking feature on another end of the assembly support pinion, and a locking member mating with the locking feature to lock the assembly support pinion in the platform. The spatial tracking assembly may be adapted to rotate at least two dimensionally with respect to the flat surface of the platform.

In another embodiment of the present invention, the boom may comprise at least one elongated boom stem attached to the fulcrum pinion at one end of the at least one boom stem, a tracking bracket slidably attached to the at least one boom stem, and an opening on the tracking bracket. The opening may serve as a receptacle for engaging the boom with the writing stylus. Three dimensional movement of the stylus tip may be translated through movement of the tracking bracket along the at least one boom stem into a two dimensional representation of a symbol.

In another embodiment of the present invention, the tracking bracket may comprise a reference tracking point fixed relative to the stylus receptacle, a reference position of the tracking bracket along the boom, and a reference position of the boom. The tracking point may lie within the writing volume and reference positions may be used to define a three dimensional coordinate space in which the stylus tip may move.

In another embodiment of the present invention, the tracking point may comprise a measurement means for measuring a time component, and a measurement means for measuring a position measurement. The position measurement may comprise measurement of a linear position along the boom and measurement of an angular position. The measurement of an angular position may comprise an angular position rendered by an angular position of the fulcrum pinion, and an angular position rendered by an angular position of the assembly support pinion. Measurements may be used to determine a dynamic state variable of the stylus tip.

In another embodiment of the present invention, the position measurement may be collected as tracking data. The tracking data may comprise output of a linear position sensor of the sliding bracket along the at least one boom stem, output of an angular position sensor of the boom around the fulcrum, and output of an angular position sensor of the reader assembly around the platform housing. Tracking data may be used to determine a dynamic state variable of the stylus tip.

In another embodiment of the present invention, the tracking data may comprise a set of measurement position and time coordinate readings. Measurement coordinates may be transformed into a spatially equivalent set of Cartesian coordinates. A conversion to font-centric coordinates may comprise a conical projection of the Cartesian coordinates onto the writing area and a restriction of the conical projection. The restriction may produce an image upon the writing area that is true to an image of a writing upon a traditional writing medium, and an identification of the restriction with a projection pre-image in writing volume of a true writing image. Three dimensional writing motions formed within the writing volume may be identified and interpreted as two dimensional handwritten symbols in real time.

These and other advantages and novel features of the present invention, as well as details of an illustrated embodiment thereof, will be more fully understood from the following description and drawings.

DETAILED DESCRIPTION OF THE INVENTION

The present invention relates to spatial tracking of handwriting for interpretation of handwriting motion using three-dimensional position sensors to identify two-dimensional signs, symbols, or glyphs made by a writing stylus in real time.

The present invention enhances an analog X-Y joystick providing the joystick with the ability to a track radial depth, i.e., along the Z axis, and capture true spatial geometry for use in capturing handwritten symbols and for use in symbol recognition in real time.

The present invention makes the foregoing objectives possible by considering an assumed X-Y typeface to be in a projection plane for a font-centric coordinate system under which symbols may be more easily discernible than in a general X-Y pixel coordinate system. The present coordinate system spans a three-dimensional volume with a font-specific origin located at a depth below the X-Y typeface plane and may be captured by employing a reading device that can additionally track the depth of pen strokes so that information can be used to identify where an intended glyph begins and ends, thereby facilitating identification of a particular glyph or symbol in real time. The addition of such invisible information may greatly improve the speed and accuracy of symbol recognition.

The present invention makes the foregoing objectives possible by providing a miniaturized electronic input device that approaches keyboard reliability and supports machine readable input at handwriting speed in freehand script. The present invention also provides an input mechanism supporting symbol encoding, wherein symbol recognition is not computationally expensive. In order to support miniaturization, the present invention provides a recording device that dispenses with the multiple electronic keys found in keyboards and keypads by replacing them with a universal reader of handwritten symbols in real time.

The present invention may provide an elongated pointing device to track a writing stylus tip by pointing toward it in planar directions from an origin suggested by a pivot point, thus providing true geometric distance measurement. The present invention may also provide for tracking radial motion of the stylus tip along a direction pointed to, (i.e., the ray), so that true Cartesian distance in the plane may be tracked.

The present invention may provide spatial tracking in a two-dimensional true geometric tracker by applying a two dimensional tracker twice. The present invention may apply the two-dimensional tracker initially to span a plane, for example, the X-Y plane. Then, by aligning the tracker's axis of rotation with the Z-axis, achieve true spatial tracking in the X-Y-Z spatial volume. The present invention may apply the same tracker a second time by configuring the axis of rotation of the second application to coincide with the ray of the first application, and aligning the two, so that the axes of rotation intersect at a point. Mounting the second two-dimensional tracker upon the first two-dimensional tracker in this fashion makes the two rotary axes orthogonal, ensuring that together they will span a three-dimensional volume.

The mounting arrangement may also make the two ray distance measurements coincident, dispensing with the need for a second radial measurement, while achieving true spatial tracking with only three measurements. To ensure that a three-dimensional volume is spanned, a restriction is made on the writing volume to the range limit imposed by each sensor. The present device may not necessarily span a 360 degree angular range, but rather may be limited to a quadrant in each angular dimension, as determined by the specific application.

The first measurement point may be the angle of rotation of the device within the X-Y plane, which may be measured as a polar coordinate angle theta ($\theta$) relative to the X-axis as ray origin and captured directly by rotational quadrature readings in the X-Y plane. A second reading from the device may be made from another quadrature device for capturing rotations that are orthogonal to the X-Y plane of rotation, and may be spherical coordinate angle phi ($\phi$), and may be defined to coincide with a Z-axis latitude angle of inclination with X-Y equatorial plane as ray origin. A third reading may be of the radial distance rho ($\rho$), and may be captured by a linear quadrature along the length of the pointing device ray, with the compound pivot-point as origin.

The captured data points of the compound spatial joystick may form spherical coordinates, and a transformation of the measurement coordinates to Cartesian font coordinates may be provided to facilitate device use as a chirographic symbol reader. Alternatively, cylindrical coordinates may also be applied to designated points in a given spatial three dimensional volume.

In the following detailed descriptions of the drawing figures, spatially orienting terms are used, such as "left", "right", "vertical", "horizontal", "upper", "lower", etc. It is to be understood that these terms are used for convenience of description of the preferred embodiments by reference to the drawings. These terms do not necessarily describe the absolute location or orientation in space, such as left, right, upward, downward, etc., that any part may assume.

Additionally, in the following detailed description, dynamic state variables are described. Dynamic state variables may comprise at least velocity and acceleration, and further may comprise linear, angular and radial dynamic states, for example, position as a function of time and motion as a function of time in any desired coordinate reference frame.

Figure 1:
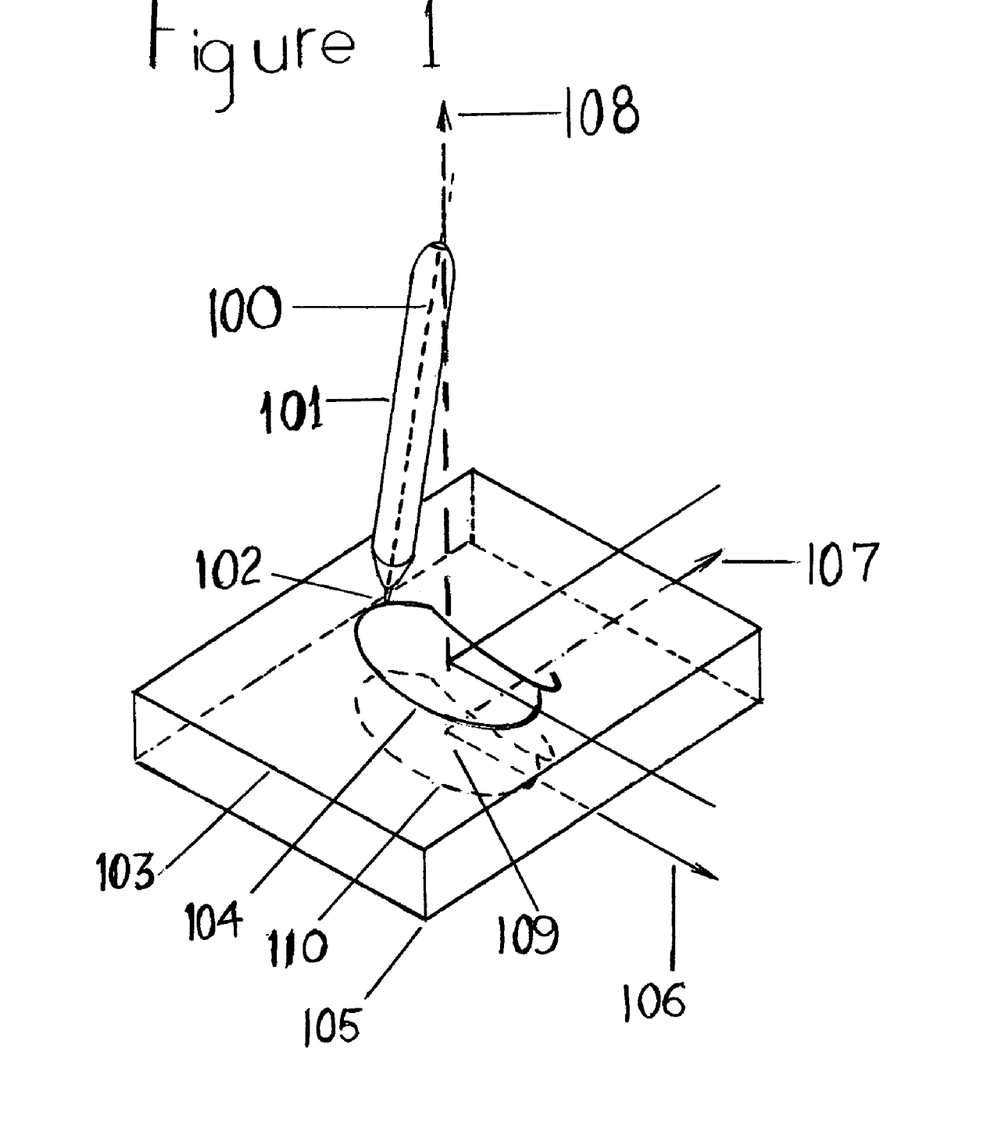
FIG. 1 illustrates a perspective view of a writing stylus illustrating the writing of small Latin letter 'a' over a writing surface within a font coordinate frame according to an embodiment of the present invention.

FIG. 1 illustrates a top perspective view of a writing instrument 101, in contact with a writing surface 103, and positioned along an imaginary line 100 above the writing surface 103. In FIG. 1, the writing instrument 101 may comprise a stylus elongate member with a writing tip 102 at the lower extremity of the stylus. The writing surface 103 is shown suitably magnified in FIG. 1 to emphasize depth above and below the actual writing 104, which is illustrated here with the sample lettering of the Latin cursive small letter 'a', for example, but may be any handwritten symbol. The writing 104, may be contained within a handwriting font face which may be defined to be the rectangular frame 105, containing an image 110, of the writing 104, projected below the surface 103.

The typeface frame 105 may also define a Cartesian X-Y coordinate system, for example, with Y-axis 106, and X-axis 107 at the center, together with a projection from an origin below the projection plane, forming the font coordinates. The writing surface 103 in FIG. 1 is shown in the horizontal X-Y plane and the depth of the writing tip 102 above and below the writing surface 103 may be measured in a direction along the Z-axis 108. The origin of the illustrated font coordinate system is shown in FIG. 1 located at point 109, at the intersection of the three axes 106,107 and 108, below the writing surface 103. The font face 105 is depicted in more detail in FIG. 2 below.

Figure 2:
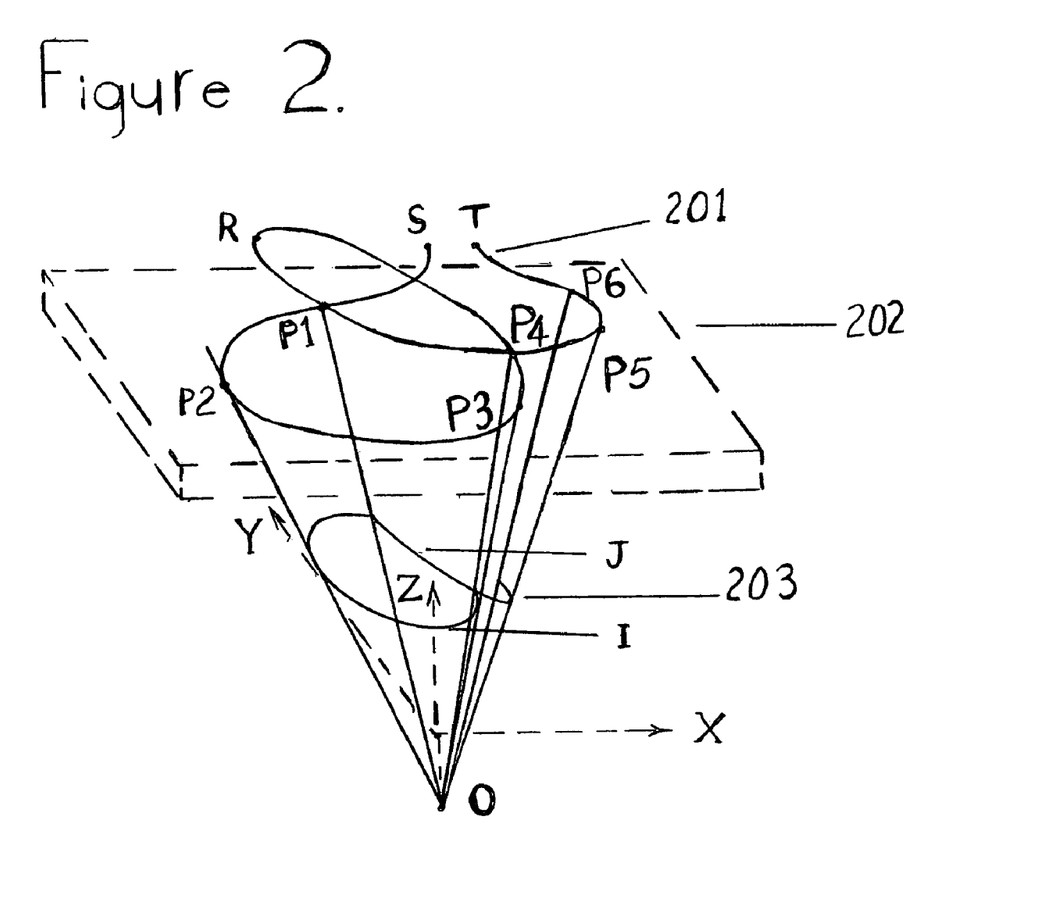
FIG. 2 illustrates an exploded view of the font face illustrating projection of the stylus trace of the small letter 'a' upon the X-Y plane according to an embodiment of the present invention.

FIG. 2 illustrates an exploded view of the font face 202. FIG. 2 introduces many invisible coordinate reference elements (points and lines) that are labeled alphabetically below, leaving the labeling of the other elements numerical. FIG. 2 illustrates at the top of the diagram a writing path 201 of the writing instrument tip over the font face 202.

The writing path 201 begins at starting point S, and sequentially traverses the points on the path marked with dots and labeled P1, P2, P3, P4, R, P5, P6, and T. Points R, S, and T of the path may lie above the font face 202, whereas points P1 to P6 inclusive may lie within the font face 202.

The writing path 201 is shown projected, conically for example, onto projected image 203, of the sample letter 'a' in a horizontal plane. The projection is not limited to being conical and alternatively may be cylindrical, spherical, or some of other shape. By convention, the projection plane lies at the bottom of the font face 202. The image's coordinate axes are on two invisible lines marked in FIG. 2 by dashed lines with arrowheads labeled X and Y, respectively. The projection is shown in the X-Y reference plane, by convention, and marks the bottom of the font face 202.

In order to support the projection described herein, the origin O of the font-centric coordinates is placed at unit standard depth below the writing surface to act as the projection apex. The origin O lies below the font face 202, by convention. The ray projecting from origin O to the center of the X-Y frame follows the Z-axis, which is a line shown in FIG. 2 by the dashed line with arrowhead labeled Z.

The projected image 203 appears in FIG. 2 as two continuous arcs I and J, corresponding to the paths P1-P2-P3-P4 and P1-P4-P5-P6, respectively, the arcs crossing each other at intersection points P1 and P4. An invisible straight line drawn connecting path points P1 and P4 may lie in the plane of the font face 202.

Figure 3:
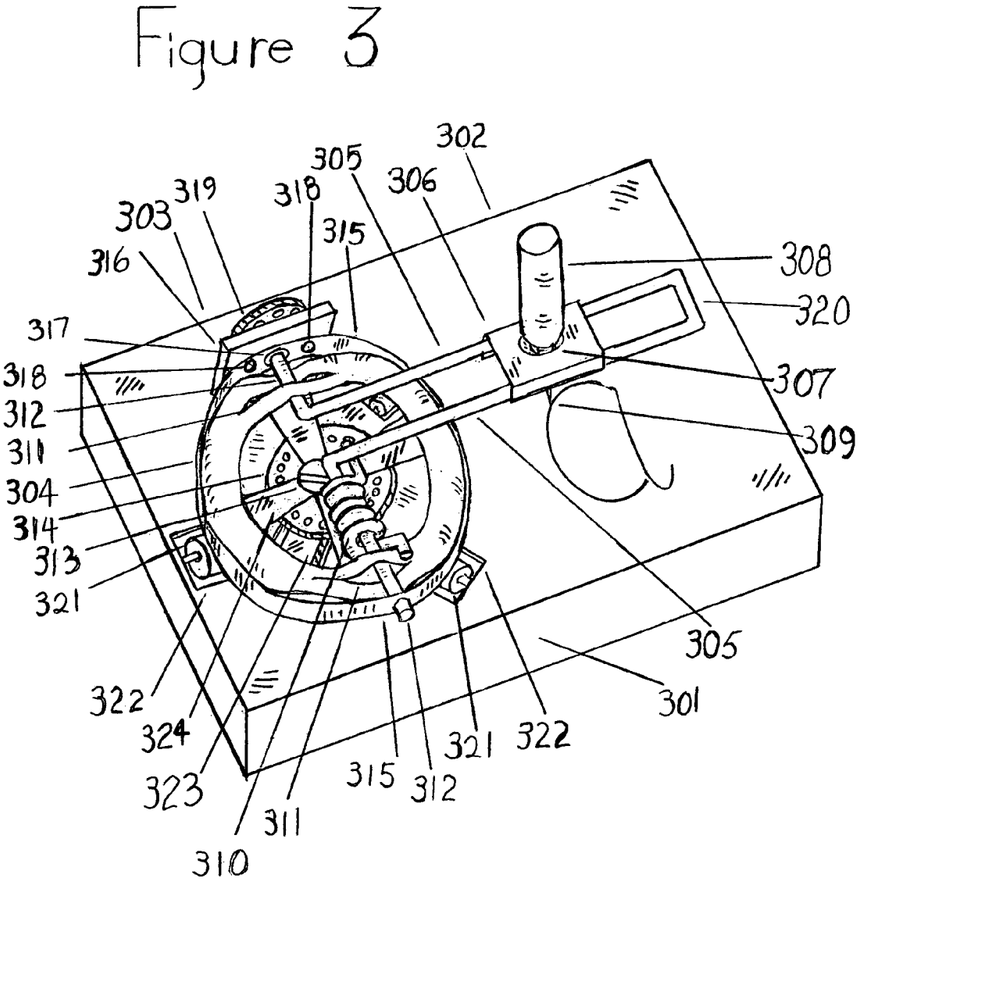
FIG. 3 illustrates a top perspective view of the chirographic reader illustrating the writing of the small letter 'a' according to an embodiment of the present invention.

FIG. 3 illustrates a perspective view of the chirographic reader illustrating the writing of small letter 'a', for example, in a writing area 302 of the base platform 301. In an embodiment of the present invention, the writing area 302 may be offset from the fulcrum support area 303 of the base platform 301. The fulcrum support platform, which rests in the generally horizontal direction, may have a vertical opening (not visible in the figure) that receives the vertical major pinion 313 of the fulcrum so that the fulcrum can swivel around horizontally. The bottom of the major pinion 313 may accommodate a locking pin in a groove around the pinion circumference to lock the fulcrum to the support base after the vertical pinion has been inserted fully into the supporting platform base.

A quadrature wheel 314 may be firmly attached at the top of the vertical pinion 313. The support platform may have a quadrature sensor 323 mounted flush with the platform surface as shown in FIG. 3 partly obscured by the quadrature wheel when the major pinion 313 is fully inserted in the platform housing. The major pinion 313 may be locked in place with a locking pin to position the quadrature wheel 314 close to the sensor 323. This is illustrated separately below in FIG. 4.

Four extensions 324 of the fulcrum bracket (only the foreground one is marked) may bend down and inward into the housing for the major pinion 313. The extensions may be adapted to fit into the housing like a sleeve between the housing body and the major pinion 313.

A boom 320 may extend the reach of the reader from the fulcrum into the writing area 302 by elongated stems 305. The support area 302 may accommodate a circular fulcrum bracket 304 having openings 311, for supporting minor pinions 312 of the reader boom stems 305. Firmly attached to the fulcrum bracket 304 may be a support collar 315 for quadrature sensor 316. The collar 315 may also rest on three horizontal stabilization rollers 321, two of which are shown in the foreground of FIG. 3. The rollers 321 may be rotatably attached to the fulcrum support base in roller housing wells 322.

The boom 320 may extend over the base platform along a linear offset from the support area into the writing area 302. The free end of the boom 320 may accommodate a bracket 306 that mates with boom stem 305 to allow the bracket 306 to slide along the boom stem 305. The bracket 306 may have a hollow receptacle 307 at the center, into which writing tip 309 of stylus 308 may be lodged to engage the chirographic reader. The stylus 308 may engage the reader by insertion of stylus tip 309 through the top side of the receptacle towards writing surface 302, as shown in FIG. 3.

Motion of the stylus tip in the boom's radial direction may be accommodated by sliding the receptacle along the boom stems 305. In an embodiment of the present invention, the position of the receptacle along the boom 320 may be derived electrically or electronically, to avoid angular inertia associated with the quadrature wheels, in real time. The position as a function of time is a measurable dynamic state variable, for example, velocity, which may be calculated. Additionally, a further dynamic state variable may be calculated, for example, acceleration, i.e., velocity as a function of time. The dynamic state variables may be calculated, manipulated, and/or described in any desired coordinate system or frame of reference.

In an embodiment of the present invention, the boom stem 305 may be made of a resistive material and the bracket 306 may be made of a conductive material so that sliding contact between the bracket 306 and the boom stem 305 may create an electrical shunt to alter an overall electrical resistance according to the bracket position along the boom 320 at a particular moment in time. The resistance may be measured at the pinion 312 sections of the boom 320. A sensor current may be applied across pinions 312 to enable measurement of the radial motion rho ($\rho$) along the boom 320. The contact point 311 may be fitted with an adhesive one-sided strip conductor that leads via bracket extensions 324 to the underside of the platform 301. The underside of the platform may house batteries to power the circuit. The electrical circuitry and batteries are not shown in the figures.

Although resistance measurement has been disclosed by way of example, the present invention is not limited to resistance measurement but also contemplates measuring changes in an electrical component by measuring one of voltage, current, resistance, inductance, impedance, etc. in real time or alternatively electronically, via solid state microchip measurement embodiments.

The boom 320 may be loaded with a spring 310 to enable the boom 320 to rest in the raised position when the stylus is retracted. One end of the spring may lock onto one of the boom stems 305 and apply spring torque to keep the unloaded boom raised. One end of the spring may coil around one of the minor pinions 312 of the boom 320. Another end of the spring may anchor the boom against the fulcrum bracket 304.

Another minor pinion 312 may extend through fulcrum bracket opening 311, opening 317 of support collar 315, and finally through an opening (not shown) in quadrature sensor 316, where the pinion end may be firmly attached to quadrature wheel 319. The pinion 312 may rotate freely through the openings and the quadrature wheel 319 may also rotate in close proximity to quadrature sensor 316 to effect rotary readings about the minor pinion 312 measured angle phi ($\phi$) in real time. Electrical circuitry associated with the quadrature sensors is not shown in the figures.

Figure 4:
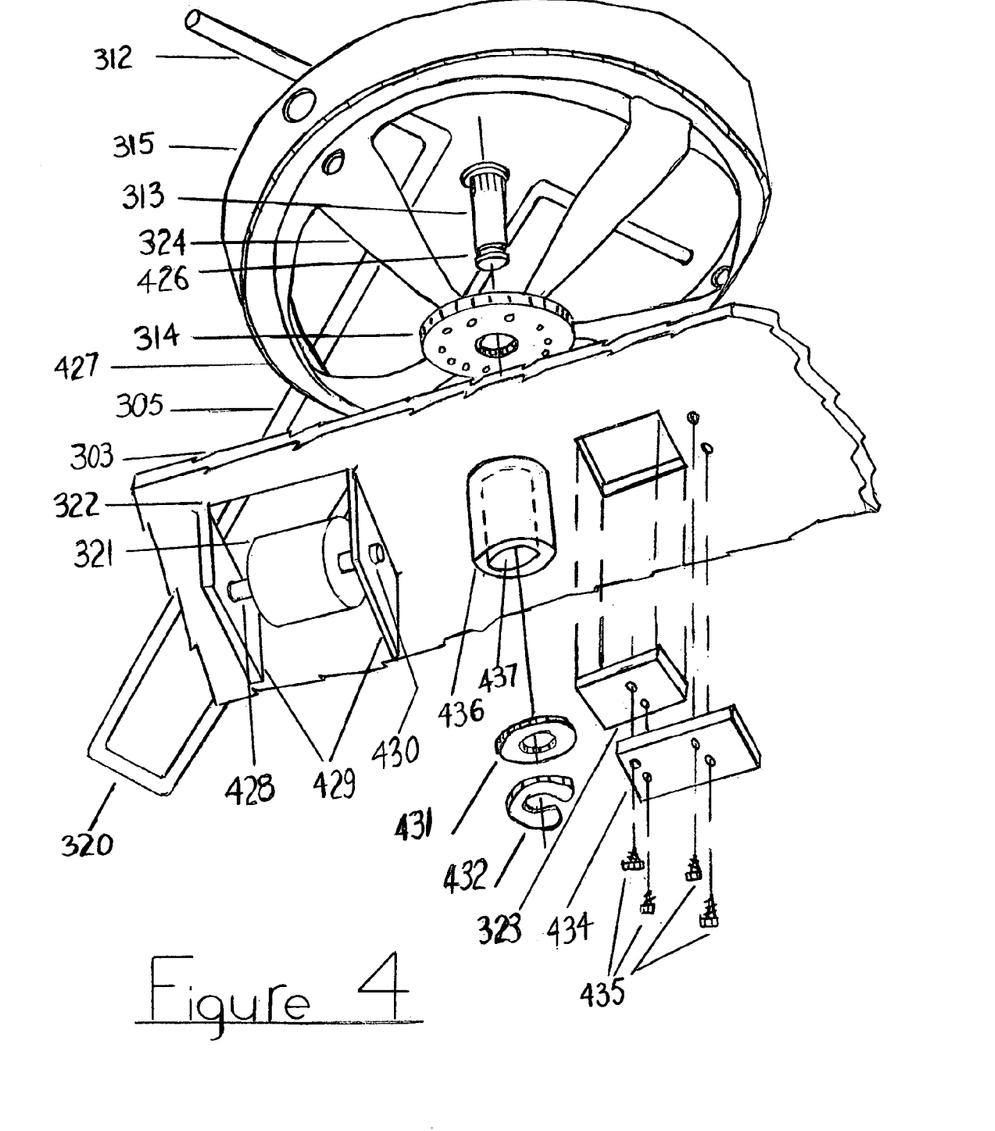
FIG. 4 illustrates a bottom exploded view of fulcrum undercarriage features that are obscured in FIG. 3 according to an embodiment of the present invention.

FIG. 4 illustrates a bottom perspective view of the fulcrum undercarriage exposing features that are obscured in the top perspective view of FIG. 3. In FIG. 4, the element numbering system of FIGS. 3 and 4 are commingled to promote unique part identification. For example, platform member 303, also shown in FIG. 3, is shown here with identical designation 303, (instead of 403), and is largely cut away to expose the upper carriage elements identified in FIG. 3. Therefore, features appearing in FIG. 4 that have already been identified in FIG. 3 are designated with the same numerical label as was used in FIG. 3, and features that are revealed for the first time in FIG. 4 are designated by new numerical labels distinct from those already assigned in FIG. 3. The newly identified items therefore begin at numeral 426, assigned to groove 426, disposed at the lower end of the major pinion 313. The underside of support collar 315 exposes the running surface 427 which makes contact with roller wheel 321, when fully assembled. The roller wheel 321 floats in the housing well 322 and may be rotatably attached with axle 428 through opening 430 on opposing flanges 429.

The pinion 313 may fit through opening 437 and may be kept true to the vertical axis by guide 436. The pinion 313 may be inserted through the friction abating washer 431 and be locked in place with pin 432. An opening 433 in the support platform 303 may accommodate quadrature sensor 323. The quadrature sensor 323 may be firmly attached to the platform 303 with the use of supporting flange 434 and screwed onto the platform 303 with screws 435. Once firmly attached, the reading side of the sensor 323 may be in close proximity to quadrature wheel 314 enabling the measurement of the angle of swivel theta ($\theta$).

Font Coordinate System of an Embodiment of the Present Invention

A font coordinate system may be a Cartesian system, for example, which may be configured so that the X-Y plane coincides with the writing portion of the support platform, and the Z-axis coincides with the projective ray pointing outwards at the middle of the font face, and with the origin O below the writing surface. While the origin O has been shown defined below the writing surface the origin O may also be above or aligned with the writing surface in other embodiments.

The measurement coordinates, when relative to the reader fulcrum pivot, may coincide with spherical coordinates such that the measured angle phi ($\phi$) may correspond to the angle of latitude, measured angle theta ($\theta$) may correspond to a polar coordinate relative to the X-axis, and measured angle rho ($\rho$) may correspond to a radial translation as follows:

$$x_m = \rho \cos(\phi)\cos(\theta);$$

$$y_m = \rho \cos(\phi)\sin(\theta); \text{ and}$$

$$z_m = \rho \sin(\phi).$$

The font coordinates may also be derived from the measurement coordinates as follows.

A reader having a base platform of unit thickness (in the Z-direction), width 4w (in the X-direction), and the font face being a square of side 2w. The distance between the reader fulcrum Z-axis and the font face Z-axis may be 2w.

$$x = x_m - 2w$$

The font origin may be at unit distance below the platform surface.

$$z = z_m - 1$$

The font face and measurement coordinates share coincident X-axes.

$$y = y_m$$

The reader receptacle may have the following range: The minimal range over the writing surface the radial distance may be 2w. The maximal distance over the writing surface may be the hypotenuse ($\sqrt{10}$)w.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment(s) disclosed, but that the invention will include all embodiments falling within the scope of the appended claims.

What is claimed is:

1. A method for spatially reading handwritten symbols proximate a writing platform, the method comprising:
    deploying a writing tip within a spatial three dimensional volume;
    writing a handwritten symbol with the writing tip;
    measuring positions of the writing tip within the volume as the handwritten symbol is being executed;
    measuring motions of the writing tip within the volume as the handwritten symbol is executed; and
    identifying two dimensional handwritten symbols from the measured three dimensional positions and motions of the writing tip by
    aligning an X-Y plane adjacent a writing portion of the writing platform;
    aligning a Z-axis with a ray pointing outward perpendicularly from the writing platform;
    defining the origin to be apart from the writing platform; and
    projecting the three dimensional positions and motions onto a two dimensional plane.

2. The method according to claim 1, wherein deploying a writing tip within the spatial three dimensional volume comprises inserting a writing stylus into a receptacle in a bracket mounted on a boom in a handwritten symbol reader.

3. The method according to claim 1, wherein writing a handwritten symbol with the writing tip comprises a user grasping a writing stylus and performing a writing upon a writing area of a handwritten symbol reader.

4. The method according to claim 1, wherein measuring positions of the writing tip within the volume comprises measuring changes in an electrical component over time as the writing tip is moved from position to position during a writing.

5. The method according to claim 4, wherein measuring positions of the writing tip within the volume further comprises measuring changes in an electrical component over time as the writing tip moves about with respect to a fixed position in space.

6. The method according to claim 4, wherein measuring changes in an electrical component further comprises measuring one of voltage, current, resistance, inductance, and impedance in real time.

7. The method according to claim 1, wherein measuring motions of the writing tip within the volume comprises measuring changes in an electrical component over time as the writing tip translates from position to position three-dimensionally during a writing.

8. The method according to claim 7, wherein measuring motions of the writing tip within the volume further comprises measuring changes in an electrical component over time as the writing tip traverses a three-dimensional path of motion with respect to a fixed position in space.

9. The method according to claim 7, wherein measuring changes in an electrical component further comprises measuring one of voltage, current, resistance, inductance, and impedance in real time.

10. The method according to claim 1, wherein identifying a two dimensional handwritten symbol from measured three dimensional positions and motions of the writing tip comprises determining measurement coordinates relative to a reader fulcrum pivot and an associated time coordinate.

11. The method according to claim 1, wherein two dimensional handwritten symbols are identified from three dimensional positions and motions that are measured by measuring the distance of the writing tip from a platform pivot and measuring an angular position of the writing tip about a first axis that is orthogonal to the two dimensional plane and measuring an angular position of the writing tip about a second axis that is orthogonal to the first axis whereby rotation about the first axis is projected on the two dimensional plane and rotation about the second axis is projected on a plane that is orthogonal to the two dimensional plane.

12. The method according to claim 11, wherein the distance from the platform pivot is measured by measurement of an electrical component and angular position about the first axis is measured by a first optical measuring device and angular position about the second axis is measured by a second optical measuring device.

13. The method according to claim 1, wherein two dimensional handwritten symbols are identified from three dimensional positions and motions wherein the three dimensional motions are measured by measuring a plurality of three dimensional positions and determining motion from those positions.

14. A device for spatially reading handwritten symbols, the device comprising:
a platform having a flat surface; and
a spatial tracking assembly positioned adjacent to and rotatably engaging a planar writing area selected from the flat surface of the platform, the spatial tracking assembly being configured to slidably accept a writing stylus and to rotate with the stylus at least about an axis parallel to the flat surface, the spatial tracking assembly comprising
a boom;
an assembly support pinion providing rotatable engagement with the flat surface of the platform;
a fulcrum housing having a fulcrum bracket connected to the assembly support pinion;
a fulcrum pinion rotatably engaging the fulcrum housing orthogonally to the assembly support pinion; and
a securing means for rotatably securing the spatial tracking assembly to the flat surface of the platform, the securing means comprising:
a restricting flange on one end of the assembly support pinion;
a locking feature on another end of the assembly support pinion; and
a locking member mating with the locking feature to lock the assembly support pinion in the platform, whereby the spatial tracking assembly is adapted to rotate at least two dimensionally with respect to the flat surface of the platform whereby a stylus tip of the writing stylus is adapted to trace a three dimensional path in a volume above the flat surface of the platform.

15. The device according to claim 14; wherein the boom comprises at least one elongated boom stem attached to the fulcrum pinion at one end of the at least one boom stem;
a tracking bracket slidably attached to the at least one boom stem; and
an opening on the tracking bracket, the opening serving as a receptacle for engaging the boom with the writing stylus, whereby three dimensional movement of the stylus tip is translated through movement of the tracking bracket with respect to the at least one boom stem into a two dimensional representation of a symbol.

16. The device according to claim 15; wherein the tracking bracket comprises:
a reference tracking point fixed relative to the stylus receptacle;
a reference position of the tracking bracket along the boom; and
a reference position of the boom, wherein the tracking point lies within the writing volume and the tracking point and reference positions define a three dimensional coordinate space in which the stylus tip moves.

17. The device according to claim 16; further comprising:
means for measuring time; and
means for measuring position, position measurement comprising:
measurement of a linear position along the boom;
measurement of an angular position, measurement of the angular position comprising:
measuring the angular position rendered by an angular position of the fulcrum pinion; and
measuring an angular position rendered by an angular position of the assembly support pinion, whereby time and position measurements are used to determine a dynamic state variable of the stylus tip and position of the stylus tip as a function of time.

18. The device according to claim 17, wherein position measurement further comprising:
measurement of a radial position of the boom, whereby radial position measurements are used to determine a dynamic state variable of the stylus tip and position of the stylus tip as a function of time.

19. The device according to claim 18, wherein position measurements are collected as tracking data, the tracking data comprising:
output of a linear position sensor, the linear position corresponding to translation of the sliding bracket along the at least one boom stem;
output of an angular position sensor, the angular position corresponding to an angle of the boom with respect to the writing surface; and
output of a radial position sensor, the radial position corresponding an angle of the boom with respect to a perpendicular axis related to the writing surface, whereby the tracking data is used to determine a dynamic state variable of the stylus tip and a position of the stylus tip as a function of time.

20. The device according to claim 19, wherein the tracking data comprises:
a set of position and time coordinates, wherein position coordinates are transformed to a spatially equivalent set of Cartesian coordinates;
a conical projection of the Cartesian coordinates onto the writing area;
a restriction of the conical projection, the restriction producing an image upon the writing area that is true to an image of a writing upon a traditional writing medium; and
an identification of the restriction with a projection pre-image in a writing volume of a true writing image, whereby three dimensional writing motions formed within the writing volume are identified and interpreted as two dimensional handwritten symbols in real time.

* * * * *